United States Patent [19]

Nukada et al.

[11] Patent Number: 5,463,041
[45] Date of Patent: Oct. 31, 1995

[54] PROCESS FOR PREPARING PURIFIED HYDROXYMETAL PHTHALOCYANINE AND ELECTROPHOTOGRAPHIC PHOTORECEPTOR USING THE SAME

[75] Inventors: Katsumi Nukada; Katsumi Daimon, both of Ashigara, Japan

[73] Assignee: Fuji Xerox Co., Ltd., Tokyo, Japan

[21] Appl. No.: 76,100

[22] Filed: Jun. 14, 1993

[30] Foreign Application Priority Data

Jun. 17, 1992 [JP] Japan ................... 4-181618

[51] Int. Cl.$^6$ ................... C09B 67/12
[52] U.S. Cl. ................... 540/139; 540/140
[58] Field of Search ................... 540/139, 140

[56] References Cited

U.S. PATENT DOCUMENTS

| | | | |
|---|---|---|---|
| 2,770,629 | 11/1956 | Eastes | 260/314.5 |
| 3,160,635 | 12/1964 | Knudsen et al. | 260/314.5 |
| 3,357,989 | 12/1967 | Byrne et al. | 260/314.5 |
| 3,708,292 | 1/1973 | Brach et al. | 96/1.5 |
| 5,059,355 | 10/1991 | Ono et al. | |
| 5,302,479 | 4/1994 | Daimon et al. | 430/78 |

FOREIGN PATENT DOCUMENTS

| | | |
|---|---|---|
| 50-38543 | 4/1975 | Japan . |
| 59-168461 | 9/1984 | Japan . |
| 59-180566 | 10/1984 | Japan . |
| 1-221459 | 9/1989 | Japan . |
| 4-5984 | 2/1992 | Japan . |
| 4-5983 | 2/1992 | Japan . |
| 2255980 | 11/1992 | United Kingdom . |

*Primary Examiner*—Nicholas Rizzo
*Assistant Examiner*—Pavanaram K. Sripada
*Attorney, Agent, or Firm*—Oliff & Berridge

[57] ABSTRACT

A process for preparing a purified hydroxymetal phthalocyanine with stable charging characteristics and small dark decay and an electrophotographic photoreceptor containing the same are disclosed. The process comprises dissolving or slurrying a precursor of a hydroxymetal phthalocyanine in an acid, precipitating a hydroxymetal phthalocyanine in a solvent or a basic solution, and heat treating the resulting hydroxymetal phthalocyanine in a basic solution. The purified hydroxymetal phthalocyanine wherein the metal is gallium is further subjected to a solvent treatment to provide a new crystal showing further improved electrophotographic characteristics.

17 Claims, 4 Drawing Sheets

PROCESS FOR PREPARING PURIFIED HYDROXYMETAL PHTHALOCYANINE AND ELECTROPHOTOGRAPHIC PHOTORECEPTOR USING THE SAME

FIELD OF THE INVENTION

This invention relates to a process for preparing a purified hydroxymetal phthalocyanine, a process for preparing a novel crystal of purified hydroxygallium phthalocyanine, and an electrophotographic photoreceptor using the same.

BACKGROUND OF THE INVENTION

Phthalocyanine compounds are useful as coatings, printing inks, catalysts or electronic materials and have recently been given extensive study particularly for their use as electrophotographic photoreceptor materials, optical recording materials and photoelectric conversion materials.

It is known that phthalocyanine compounds generally exhibit several different crystal forms depending on the process of production or the process of treatment and that the difference in crystal form has a great influence on their photoelectric conversion characteristics. For example, known crystal forms of copper phthalocyanine include $\alpha$, $\pi$, $\chi$, $\rho$, $\gamma$, and $\delta$-forms as well as a stable $\beta$-form. These crystal forms are known capable of interconversion by a mechanical strain, a sulfuric acid treatment, an organic solvent treatment, a heat treatment, and the like as described, e.g., in U.S. Pat. Nos. 2,770,629, 3,160,635, 3,708,292, and 3,357,989. Further, JP-A-50-38543 (the term "JP-A" as used herein means an "unexamined published Japanese patent application") has a mention of the relationship between a crystal form of copper phthalocyanine and its electrophotographic characteristics.

Besides copper phthalocyanine, it has been proposed to use various crystal forms of metal-free phthalocyanine, hydroxygallium phthalocyanine, chloroaluminum phthalocyanine, chloroindium phthalocyanine, etc. in electrophotographic photoreceptors. In the course of study on the relationship between crystal forms of various phthalocyanine compounds and their electrophotographic characteristics, the present inventors previously discovered novel five crystal forms of hydroxygallium phthalocyanine and revealed their excellent characteristics as a photoreceptor as described in GB 2 255 980 A.

While JP-A-1-221459 refers to the relationship between the crystal form of hydroxygallium phthalocyanine and the electrophotographic characteristics, the mention is confined to those crystals obtained only by acid pasting. On the other hand, JP-A-59-168461 and JP-A-59-180566 disclose a process for obtaining a phthalocyanine pigment having a specific crystal form which comprises mixing a phthalocyanine derivative having an electron attracting substituent with an inorganic acid capable of forming a salt with phthalocyanine and precipitating the desired specific crystal by addition to water or a basic substance. However, there is mentioned no specific procedure for precipitating the desired pigment with the basic substance.

It has been difficult to obtain hydroxymetal phthalocyanine crystals having stable characteristics by ordinary acid pasting. That is, the resulting crystals, though having the same crystal form, show large scatter in characteristics, particularly charging properties and dark decay rate, when used as an electrophotographic photoreceptor. Moreover, any of the phthalocyanine compounds proposed to date, inclusive of the above-mentioned hydroxygallium phthalocyanine crystals, is still unsatisfactory in photosensitivity and durability as a photosensitive material.

It has thus been demanded to develop a phthalocyanine compound with stable charging characteristics and a small dark decay rate as well as improved photosensitivity and improved durability.

The present inventors conducted extensive studies for obtaining phthalocyanine compounds with stable characteristics and proposed a phthalocyanine compound obtained by wet grinding as disclosed in GB 2 255 980 A. However, the proposed process requires much time in wet grinding and tends to cause image defects due to incorporation of foreign matters, such as media, unless meticulous care should be devoted.

The inventors continued their study on a simpler and easier process for stabilization of characteristics and found as a result that a hydroxymetal phthalocyanine compound with highly stabilized characteristics can be obtained by a simple process comprising subjecting a precursor of a hydroxymetal phthalocyanine to acid pasting using water as a precipitating solvent and heat treating the precipitated crystal in a basic solution. They further found that replacement of water with a basic aqueous solution in the above-described acid pasting brings better results.

It is generally well known to obtain a pigment by subjecting a phthalocyanine compound, such as oxytitanium phthalocyanine or metal-free phthalocyanine, to acid pasting. In the case of these phthalocyanine compounds other than hydroxymetal phthalocyanine compounds, hydroxymetal phthalocyanine compounds with stable characteristics can be obtained simply by thoroughly washing the pigment after acid pasting followed by neutralization with, for example, diluted aqueous ammonia at room temperature.

According to the inventors' study, the above-mentioned difference between general phthalocyanine pigments and hydroxymetal phthalocyanine pigments was proved ascribable to the marked difference in the state after acid pasting. That is, general phthalocyanine pigments precipitated in an acidic solution after acid pasting assume a bright blue color, whereas hydroxymetal phthalocyanine pigments assume a dark green color in an acidic solution after acid pasting and turn to bright blue after being rendered weakly basic.

This indicates that the hydroxyl group possessed by hydroxymetal phthalocyanine pigments is much more susceptible to protonation as compared with general phthalocyanine pigments. It is assumed therefore that the acid resulting from the protonation is not sufficiently removed simply by washing with water after acid pasting followed by neutralization with diluted aqueous ammonia and that the characteristics of the pigment are subject to variation due to the trace residual acid.

The above-mentioned character of hydroxymetal phthalocyanine pigments may be applied to a pH sensor, a gas sensor, etc.

SUMMARY OF THE INVENTION

An object of the present invention is to provide a process for preparing a purified hydroxymetal phthalocyanine having stabilized charging characteristics and small dark decay.

Another object of the present invention is to provide an electrophotographic photoreceptor containing such a hydroxymetal phthalocyanine.

As a result of extensive investigations, the inventors have found that the above objects of the present invention are accomplished by purifying a hydroxymetal phthalocyanine obtained by acid pasting by a heat treatment in a basic solvent. They also found that further treatment of the resulting purified hydroxygallium phthalocyanine with a solvent affords a novel crystal with higher sensitivity and durability. The present invention has been completed based on these findings.

The present invention relates to a process for preparing a purified hydroxymetal phthalocyanine comprising dissolving or slurrying a precursor of a hydroxymetal phthalocyanine in an acid, precipitating a hydroxymetal phthalocyanine in a solvent or a solvent having dissolved therein a base (i.e., a basic solution), and heat treating the resulting hydroxymetal phthalocyanine in a basic solution.

The present invention also relates to a process for preparing a novel hydroxygallium phthalocyanine crystal showing intense diffraction peaks at Bragg angles (2θ±0.2°) of (1) 7.5°, 9.9°, 12.5°, 16.3°, 18.6°, 25.1°, and 28.3°, (2) 7.7°, 16.5°, 25.1°, and 26.6°, (3) 7.9°, 16.5°, 24.4°, and 27.6°, (4) 7.0°, 7.5°, 10.5°, 11.7°, 12.7°, 17.3°, 18.1°, 24.5°, 26.2°, and 27.1°, or (5) 6.8°, 12.8°, 15.8°, and 26.0° in X-ray diffratometry which comprises further subjecting the thus purified hydroxymetal phthalocyanine wherein the coordinating metal is gallium, i.e., hydroxygallium phthalocyanine, to a solvent treatment.

The present invention further relates to an electrophotographic photoreceptor containing at least one of the above-described purified hydroxymetal phthalocyanine crystals in a photosensitive layer.

DETAILED DESCRIPTION OF THE INVENTION

Hydroxymetal phthalocyanines of the present inveniton are represented by a general formula (I):

where M represents a coordinating metal, $R_1$, $R_2$, $R_3$ and $R_4$ each represented a halogen atom or an aliphatic alkoxy group having from 1 to 5 carbon atoms; and k, l, m and n each represents an interger of from 0 to 4.

In the present invention, the X-ray diffraction pattern in the measurement results of intensities of the Bragg angle (2θ) respect to CuKα characteristic X-ray (wavelength: 1,541 Å). The measurement conditions are as follows:
Apparatus: X-ray diffractiometer (RAD-RC produced by Rigaku K.K.)
Target: Cu (1.54050 Å)
Voltage: 40.0 KV
Stage angle: 5.00 deg
Stop angle: 40.00 deg
Step angle: 0.020 deg The purified hydroxymetal phthalocyanine crystals according to the present invention can be prepared through the following steps.

Step 1 (Acid pasting):
A precursor of a hydroxymetal phthalocyanine, such as a chlorometal phthalocyanine synthesized by a known process is dissolved or slurried in an acid, and the solution or slurry is added to a solvent or a basic solution to precipitate a hydroxymetal phthalocyanine.

Step 2 (Heat treatment):
The resulting hydroxymetal phthalocyanine is purified by heat treating in a basic solution.

The Examples of the hydroxymetal phthalocyanine precursor used in the present invention, that is, the purified hydroxymetal phthalocyanines by the above method, include phthalocyanine compounds including aluminum, gallium, indium, silicon, germanium, tin, etc as a coordinating metal.

In step (1), a hydroxymetal phthalocyanine precursor, e.g., a chlorometal phthalocyanine, is added to an acid to form a solution, a slurry, or a suspension (hereinafter inclusively referred to as an acid pasting liquid). Besides sulfuric acid (concentrated sulfuric acid), orthophosphoric acid, pyrophosphoric acid, chlorosulfonic acid, or hydrobromic acid is used as the acid which can be used in this acid pasting.

The acid which can be used in this acid pasting is preferably added to the extent that the hydroxymetal phthalocyanine precursor is dissolved perfectly. That is, the amount of the acid is 10 parts or more, preferably from 10 to 30 parts, and more preferably from 15 to 20 parts by weight of the hydroxymetal phthalocyanine precursor. The acid may be excess of the hydroxymetal phthalocyanine precursor, however, if more than perfect dissolution, there gives rise to a problem in the waste solution processing.

Precipitation of a hydroxymetal phthalocyanine from the acid pasting liquid is usually carried out with a large excess of water as a precipitating solvent. Besides water, a mixture of water and a water-soluble organic solvent, such as lower alcohols (e.g., methyl alcohol and ethyl alcohol), lower ketones (e.g., acetone and methyl ethyl ketone), ethers (e.g., diethyl ether, methyl cellosolve and dioxane), dimethylformamide or dimethyl sulfoxide, may also be used.

Where precipitation is effected with a basic solution, the base which can be used is not limited as far as it is water-soluble and proton-accepting. Examples of suitable bases include alkali hydroxides, e.g., sodium hydroxide and potassium hydroxide, alkali carbonates, e.g., sodium carbonate and potassium carbonate, magnesium hydroxide, ammonia, and various quaternary ammonium hydroxides. Of them, ammonia is preferable because it is easy to be removed. The base is usually used in an amount of from 0.5 to 1.5 mols, and preferably of from 0.8 to 1.2 mols, per mol of the acid.

Since addition of the acid pasting liquid to a solvent or a basic solution to cause hydrolysis of the hydroxymetal phthalocyanine precursor is accompanied with vigorous heat generation, the acid pasting liquid is added while vigorously stirring the solvent or basic solution at a temperature below room temperature, for example, under cooling to $-10°$ to $10°$ C. Where the hydrolysis is conducted in a basic solution, the solution does not always need to be cooled, and the reaction may be carried out while heating at $40°$ to $100°$ C. The hydroxymetal phthalocyanine obtained by the hydrolysis in a basic solution exhibits improved electrophotographic characteristics over those obtained by hydrolysis in a mere solvent as shown in Table 3 (Example 18) hereinafter described.

It is preferable that the hydroxymetal phthalocyanine precipitated in a solvent containing no base is washed with water or a diluted basic aqueous solution to effectively remove the residual acid and the anion resulting from the hydrolysis of the hydroxymetal phthalocyanine precursor beforehand.

In step (2), the same base and solvent as used in step (1) are employed. The basic solution to be used here suitably has a pH of from a weakly alkaline pH to about 12, and preferably from 8 to 10.

The heat treatment is carried out at a temperature of from $40°$ to $120°$ C., and preferably from $70°$ to $95°$ C., for a period of from 10 minutes to 6 hours, and preferably from 0.5 to 2 hours, while stirring. By this heat treatment, the acid and anion remaining in the hydroxymetal phthalocyanine migrate to the basic solution and are thereby removed sufficiently from the hydroxymetal phthalocyanine. If the heating temperature is less than $40°$ C., it is difficult to sufficiently purify the hydroxymetal phthalocyanine.

Where a basic aqueous solution is used for precipitation in step (1), the precipitated hydroxymetal phthalocyanine does not need to be isolated and can be subjected to the heat treatment of step (2) either as it is or after pH adjustment with a base.

There is thus obtained a purified hydroxymetal phthalocyanine from a hydroxymetal phthalocyanine precursor.

Where the acid pasting of step (1) is carried out in a basic solution instead of cooled water, and the resulting hydroxymetal phthalocyanine is subsequently subjected to the heat treatment of step (2), the residual amounts of the acid and anion are greatly reduced to provide a hydroxymetal phthalocyanine pigment with particularly improved electrophotographic characteristics.

According to a conventional acid pasting procedure, a concentrated acid pasting liquid is generally added dropwise to cooled water because of vigorous heat generation. There is found no report that an acid pasting liquid is added dropwise to a basic solution.

Of the thus purified hydroxymetal phthalocyanine pigments, hydroxygallium phthalocyanine can be converted to a novel crystal having increased photosensitivity and durability by further treatment with a solvent.

The solvents which can be used in this solvent treatment include the following groups divided according to the form of the resulting crystal (the crystal form of the resulting hydroxygallium phthalocyanine may vary depending on the treating conditions).

1) Solvents which can be used for preparing a crystal showing intense diffraction peaks at Bragg angles ($2\theta \pm 0.2°$) of $7.5°$, $9.9°$, $12.5°$, $16.3°$, $18.6°$, $25.1°$, and $28.3°$ in X-ray diffratometry include amides (e.g., N,N-dimethylformamide, N,N-dimethylacetamide, and N-methylpyrrolidone), esters (e.g., ethyl acetate, n-butyl acetate, and isoamyl acetate), and ketones (e.g., acetone, methyl ethyl ketone, and methyl isobutyl ketone).

2) Solvents which can be used for preparing a crystal showing intense diffraction peaks at Bragg angles ($2\theta \pm 0.2°$) of $7.7°$, $16.5°$, $25.1°$, and $26.6°$ in X-ray diffractometry include alcohols (e.g., methyl alcohol and ethyl alcohol), polyhydric alcohols (e.g., ethylene glycol, glycerin, and polyethylene glycol), sulfoxides (e.g., dimethyl sulfoxide), and aromatic solvents (e.g., toluene and chlorobenzene).

3) Solvents which can be used for preparing a crystal showing intense diffraction peaks at Bragg angles ($2\theta \pm 0.2°$) of $7.9°$, $16.5°$, $24.4°$, and $27.6°$ in X-ray diffractometry include amides (e.g., N,N-dimethylformamide, N,N-dimethylacetamide, and N-methylpyrrolidone), organic amines (e.g., pyridine and piperidine), and sulfoxides (e.g., dimethyl sulfoxide).

4) Solvents which can be used for preparing a crystal showing intense diffraction peaks at Bragg angles ($2\theta \pm 0.2°$) of $7.0°$, $7.5°$, $10.5°$, $11.7°$, $12.7°$, $17.3°$, $18.1°$, $24.5°$, $26.2°$, and $27.1°$ in X-ray diffractometry include aromatic alcohols (e.g., benzyl alcohol).

5) Solvents which can be used for preparing a crystal showing intense diffraction peaks at Bragg angles ($2\theta \pm 0.2°$) of $6.8°$, $12.8°$, $15.8°$, and $26.0°$ in X-ray diffractometry include polyhydric alcohols (e.g., ethylene glycol, glycerin, and polyethylene glycol).

The solvents in each of groups (1) to (5) described above may be used as a mixture of two or more thereof or as a mixture with water.

The mode of the solvent treatment includes not only general recrystallization but other modes, such as washing, wet grinding, immersion, and suspension stirring.

The solvent is usually used in an amount of from 1 to 200 parts, and preferably from 10 to 100 parts, by weight per part by weight of hydroxygallium phthalocyanine to be treated. The solvent treatment is usually carried out at a temperature of from 0° to 150° C., and preferably from room temperature to 100° C. The solvent treatment may be effected in an appropriate container either by allowing the system to stand or while stirring. Further, the solvent treatment may be effected while wet grinding with a selected solvent by means of a ball mill, a mortar, a sand mill, a kneader, an attritor, etc. Grinding aids, such as an inorganic compound (e.g., sodium chloride or sodium sulfate (salt cake)) and a grinding medium (e.g., glass beads, steel beads or alumina beads) may be used in the wet grinding. There is thus obtained a novel hydroxygallium phthalocyanine crystal having satisfactory crystal properties and a regular crystal size.

The electrophotographic photoreceptor according to the present invention in which the above-described hydroxymetal phthalocyanine crystals are used as a charge generating material in the photosensitive layer thereof will be explained below.

A photosensitive layer of the photoreceptor may have a single layer structure or a so-called separate function type laminate structure composed of a charge generating layer and a charge transporting layer. In the latter structure, the charge generating layer is composed of the hydroxymetal phthalocyanine crystal prepared by the process of the present invention and a binder resin.

A preferred embodiment of the photoreceptor comprises a conductive substrate having thereon a photosensitive layer composed of a charge generating layer and a charge transporting layer with a subbing layer being interposed between the photosensitive layer and the conductive substrate.

A charge generating layer can be formed by coating a conductive substrate with a coating composition prepared by dissolving a binder resin in an organic solvent and dispersing the hydroxymetal phthalocyanine of the present invention in the resin solution. A preferred hydroxymetal phthalocyanine as a charge generating material is the above-mentioned hydroxygallium phthalocyanine with its crystal form converted by the solvent treatment. More preferred hydroxymetal phthalocyanine as a charge generating material is the hydroxygallium phthalocyanine with to a solvent treatment to convert ite crystal form to a crystal form showing intense diffraction peaks at Bragg angles (2θ±0.2°) of (1) 7.5°, 9.9°, 12.5°, 16.3°, 18.6°, 25.1°, and 28.3° in X-ray diffratometry.

Binder resins to be used can be chosen from a broad range of insulating resins, such as polyvinyl butyral resins and polyvinyl formal resins.

Solvents to be used for dissolving the binder resin are preferably selected from those incapable of dissolving a subbing layer.

A weight ratio of the hydroxymetal phthalocyanine crystal to the binder resin is preferably from 40:1 to 1:20. The hydroxymetal phthalocyanine crystal can be dispersed in the resin solution by a general means, e.g., a ball mill, an attritor or a sand mill.

The coating composition is coated by any of general coating techniques, such as dip coating, spray coating, spinner coating, bead coating, wire bar coating, blade coating, roller coating, air knife coating, curtain coating, and the like. The charge generating layer usually has a thickness of from about 0.05 to 5 μm.

A charge transporting layer consists of a charge transporting material and an appropriate binder resin. Examples of suitable charge transporting materials include N,N'-diphenyl-N,N'-bis(m-tolyl)benzidine, 4-diethylaminobenzaldehyde 2,2-diphenylhydrazone, and p-(2,2-diphenylvinyl)-N, N-diphenylaniline.

The charge transporting layer can be formed by coating a charge generating layer with a coating composition prepared from the above-described charge transporting material and the similar binder resin and organic solvent as used for a charge generating layer by the similar coating technique as described above. A suitable weight ratio of the charge transporting material to the binder resin is from 10:1 to 1:5. The charge transporting layer usually has a thickness of from about 5 to 50 μm.

A photosensitive layer having a single layer structure comprises a photoconductive layer in which the hydroxymetal phthalocyanine crystal of the present invention and a charge transporting material are dispersed in a binder resin. The components and coating technique used here are the same as those hereinabove described. A preferred weight ratio of the charge transporting material to the binder resin is from about 1:20 to 5:1, and a preferred weight ratio of the hydroxymetal phthalocyanine crystals to the charge transporting material is from about 1:10 to 10:1.

Any type of a conductive substrate can be used as long as applicable as an electrophotographic photoreceptor.

If desired, a subbing layer containing a polyamide resin, a polycarbonate resin, a zirconium chelate compound, a titanyl chelate compound, etc. may be provided between a conductive substrate and a photosensitive layer. The subbing layer is effective for blocking unnecessary charges which may be introduced from the conductive substrate into a photosensitive layer on charging of the photosensitive layer.

Further, a protective layer may be provided on the surface of a photosensitive layer. The protective layer serves to prevent chemical denaturation of a charge transporting layer upon charging and also to improve mechanical strength of the photosensitive layer.

The present invention will now be illustrated in greater detail with reference to Examples, but it should be understood that the present invention is not construed as being limited thereto. All the parts and percents are by weight unless otherwise indicated.

SYNTHESIS EXAMPLE

Synthesis of Chlorogallium Phthalocyanine

To 230 parts of quinoline were added 30 parts of 1,3-diiminoisoindoline and 9.1 parts of gallium trichloride, and the mixture was allowed to react at 200° C. for 3 hours. The reaction product was collected by filtration and washed successively with acetone and methyl alcohol, and the wet cake was dried to obtain 28 parts of chlorogallium phthalocyanine crystals.

EXAMPLE 1

Figure 1:
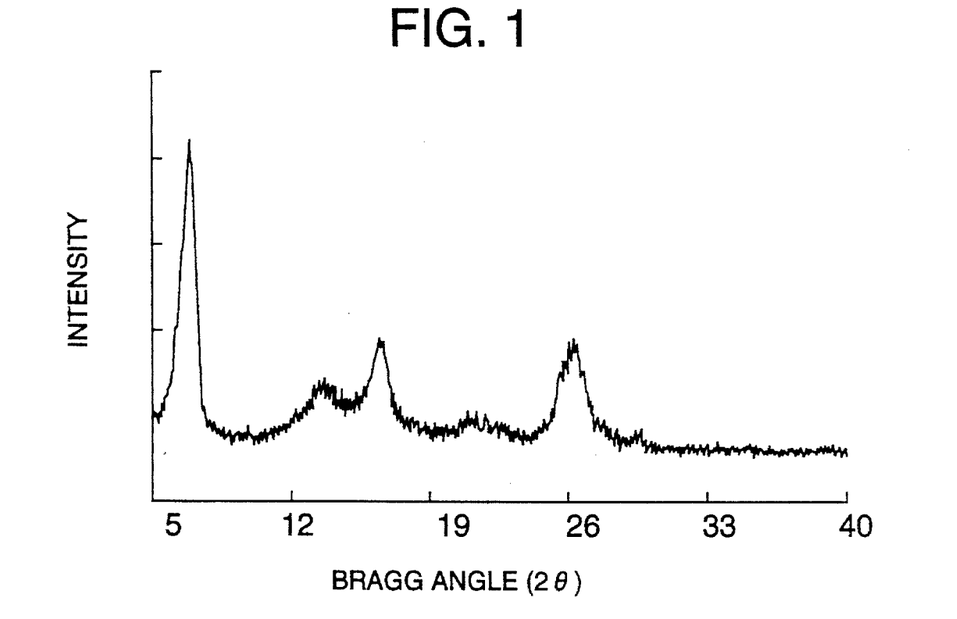
FIG. 1 is a powder X-ray diffraction pattern of the hydroxygallium phthalocyanine crystal obtained in Example 1.

Three parts of the chlorogallium phthalocyanine crystals obtained in Synthesis Example were dissolved in 90 parts of concentrated sulfuric acid at 0° C., and the solution was added dropwise to 450 parts of distilled water at 5° C. to precipitate crystals. The precipitated hydroxygallium phthalocyanine crystals were thoroughly washed with distilled water, suspended in 100 ml of 2% aqueous ammonia, stirred at 85° C. for 1 hour, thoroughly washed with distilled water, and dried to obtain 2.6 parts of hydroxygallium phthalocyanine crystals. A powder X-ray diffraction pattern of the resulting crystals is shown in FIG. 1.

EXAMPLES 2 TO 4

Fifteen parts of the chlorogallium phthalocyanine obtained in Synthesis Example were dissolved in 450 parts of concentrated sulfuric acid at 0° C., and the solution was added dropwise to 2250 parts of distilled water at 5° C. to precipitate crystals. The crystals collected were thoroughly washed with distilled water and divided into three equal portions.

To each portion was added 100 ml of a 0.1N sodium hydroxide aqueous solution. Then, the solution was heated at 85° C. with stirring for 0.5 hour (Example 2), 1 hour (Example 3) or 2 hours (Example 4). The crystals were thoroughly washed with distilled water and dried to obtain hydroxygallium phthalocyanine crystals. A powder X-ray diffraction pattern of the thus purified crystals prepared from each portion was the same as FIG. 1.

EXAMPLE 5

Six parts of the chlorogallium phthalocyanine obtained in Synthesis Example were dissolved in 180 parts of concentrated sulfuric acid at 0° C., and the acid solution was added dropwise to 900 parts of distilled water at 5° C. having dissolved therein 147 g of sodium hydroxide to precipitate crystals. The solution as containing the precipitate was divided into halves. The solution after the dropwise addition had a pH of about 12.

One of the halves was heated at 85° C. for 1 hour, thoroughly washed with distilled water, and dried to obtain hydroxygallium phthalocyanine crystals. A powder X-ray diffraction pattern of the crystals was the same as FIG. 1.

COMPARATIVE EXAMPLE 1

Figure 2:
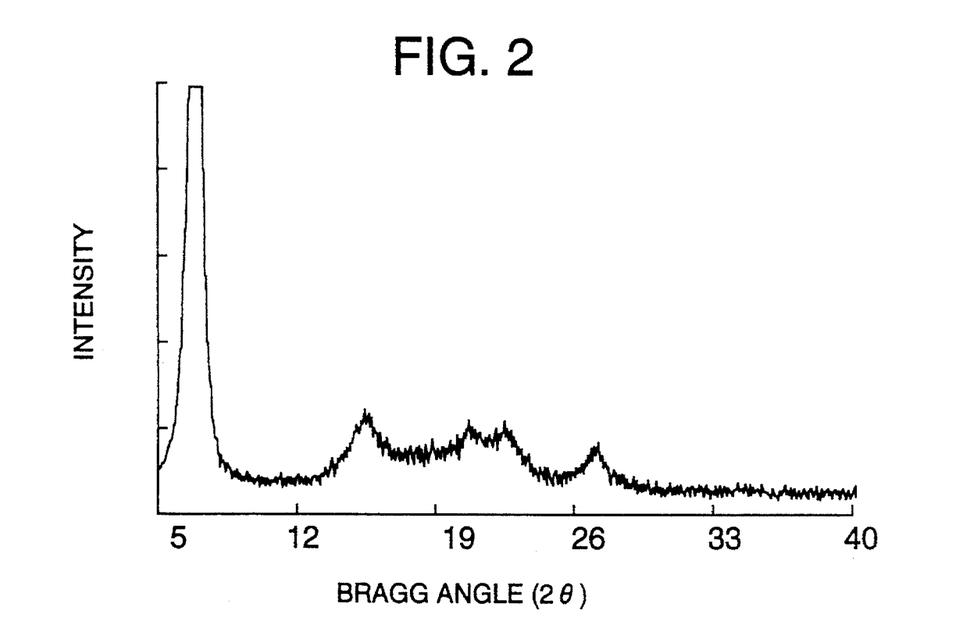
FIG. 2 is a powder X-ray diffraction pattern of the the hydroxygallium phthalocyanine crystal obtained in Comparative Example 1.

Three parts of the chlorogallium phthalocyanine obtained in Synthesis Example were dissolved in 90 parts of concentrated sulfuric acid at 0° C., and the solution was added dropwise to 450 parts of distilled water at 5° C. The precipitated crystals were thoroughly washed with distilled water. A powder X-ray diffraction pattern of the resulting crystals is shown in FIG. 2.

The crystals were suspended in 100 ml of 2% aqueous ammonia, whereupon the crystals changed from deep green to deep blue. The suspension was stirred at room temperature for 1 hour, thoroughly washed with distilled water, and dried to obtain 2.5 parts of hydroxygallium phthalocyanine crystals. A powder X-ray diffraction pattern of the resulting crystals was the same as FIG. 1.

COMPARATIVE EXAMPLE 2

Three parts of the chlorogallium phthalocyanine obtained in Synthesis Example were dissolved in 90 parts of concentrated sulfuric acid at 0° C., and the solution was added dropwise to 450 parts of distilled water at 5° C. The precipitated crystals were thoroughly washed with distilled water and then suspended in 100 ml of a 0.1N sodium hydroxide aqueous solution, followed by stirring at room temperature for 1 hour. The crystals were thoroughly washed with distilled water and dried to collect 2.5 parts of hydroxygallium phthalocyanine crystals. A powder X-ray diffraction pattern of the resulting crystals was the same as FIG. 1.

COMPARATIVE EXAMPLE 3

The remaining half portion prepared in Example 5 was filtered, and the wet cake was thoroughly washed with distilled water and dried to obtain hydroxygallium phthalocyanine crystals. A powder X-ray diffraction pattern of the resulting crystals was the same as FIG. 1.

EXAMPLES 6 TO 10

In 15 parts of N,N-dimethylformamide was added 0.5 part of the hydroxygallium phthalocyanine crystals obtained in Examples 1 to 5 and milled for 24 hours together with 30 parts of glass beads (diameter: 1 mm). The separated crystals were washed with methyl alcohol and dried to obtain hydroxygallium phthalocyanine crystals. A powder X-ray diffraction pattern of the resulting hydroxygallium phthalocyanine crystals is shown in Table 1 below.

COMPARATIVE EXAMPLES 4 TO 6

The hydroxygallium phthalocyanine crystals obtained in Comparative Examples 1 to 3 were each treated in the same manner as in Example 6. A powder X-ray diffraction pattern of the resulting hydroxygallium phthalocyanine crystals is shown in Table 1.

TABLE 1

Figure 3:
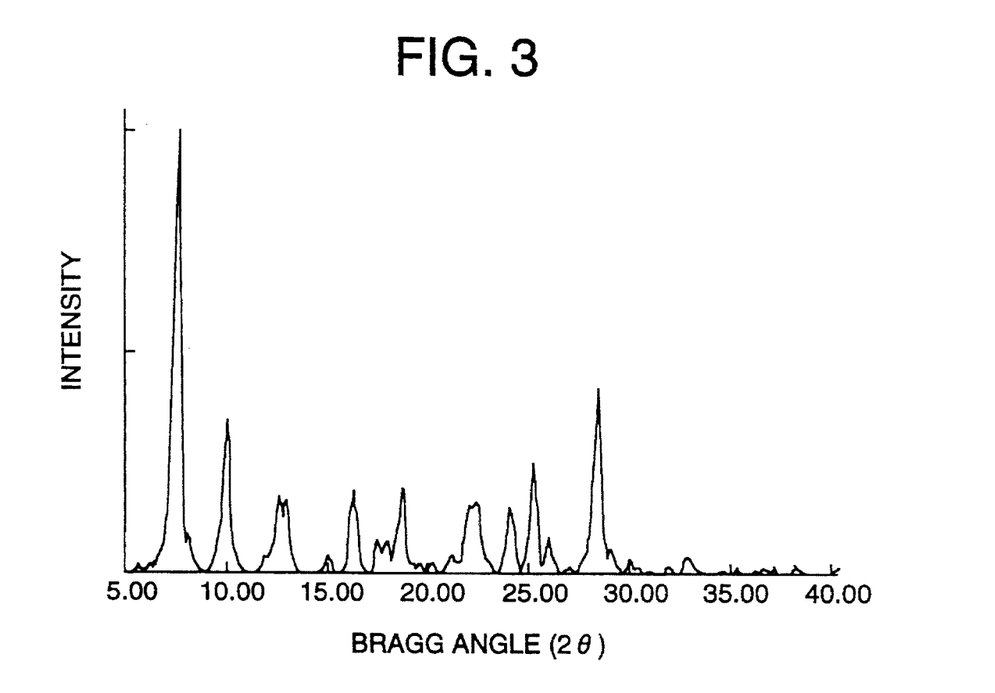
FIGS. 3 and 5 to 8 is each a powder X-ray diffraction pattern of the hydroxygallium phthalocyanine crystals obtained in Examples 6 and 11 to 14, respectively.
Figure 4:
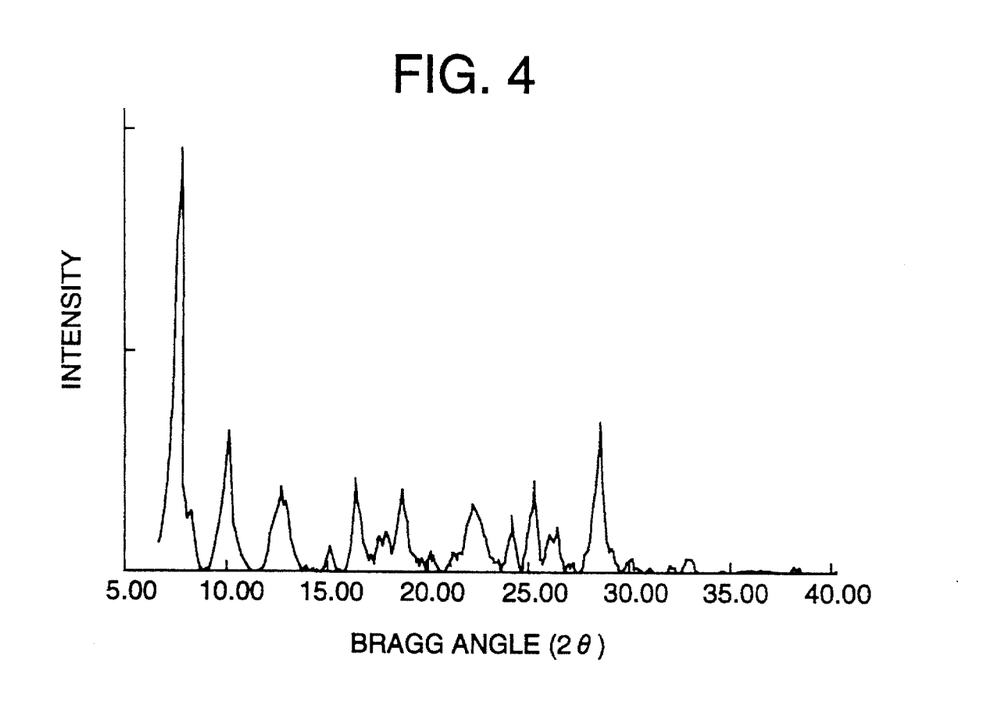
FIG. 4 is a powder X-ray diffraction pattern of the hydroxygallium phthalocyanine crystals obtained in Comparative Example 4.

| Example No. | Hydroxygallium Phthalocyanine | Powder X-ray Diffraction Pattern |
|---|---|---|
| Example 6 | Example 1 | FIG. 3 |
| Example 7 | Example 2 | the same as FIG. 3 |
| Example 8 | Example 3 | " |
| Example 9 | Example 4 | " |
| Example 10 | Example 5 | " |
| Comparative Example 4 | Comparative Example 1 | FIG. 4 |
| Comparative Example 5 | Comparative Example 2 | the same as FIG. 4 |
| Comparative Example 6 | Comparative Example 3 | the same as FIG. 3 |

EXAMPLES 11 TO 13

In 15 parts of each solvent shown in Table 2 below, 0.5 part of the hydroxygallium phthalocyanine crystals obtained in Example 4 were milled together with 30 parts of glass beads (diameter: 1 mm) for 24 hours, and the crystals were separated. The separated crystals were washed with methyl alcohol and dried. A powder X-ray diffraction pattern of the resulting crystals is shown in FIGS. 5 to 7.

TABLE 2

Figure 5:
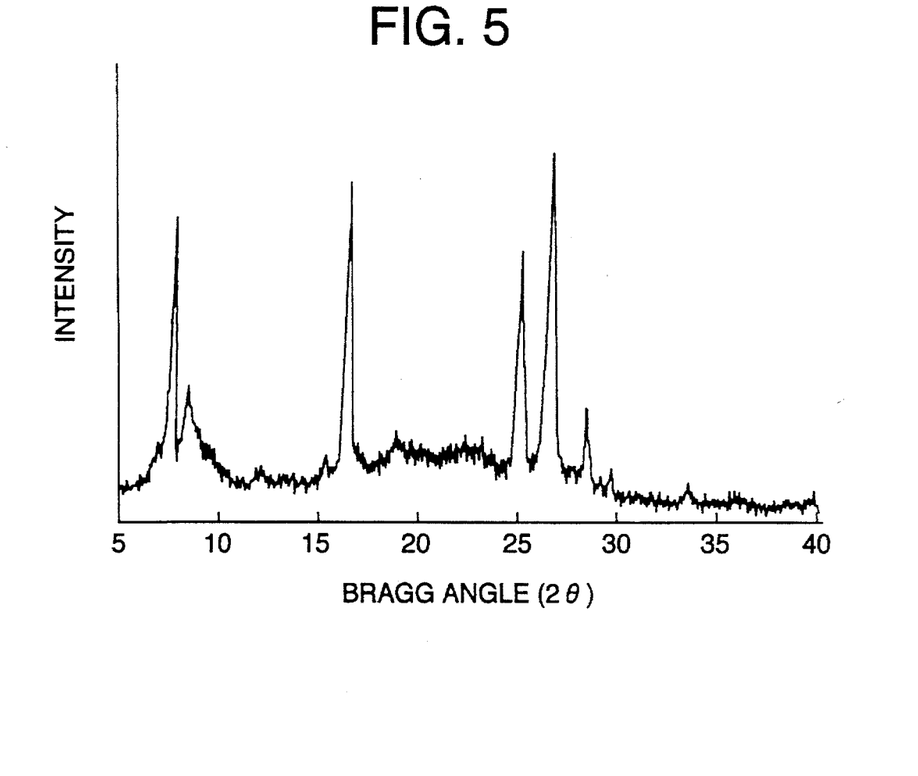
Figure 6:
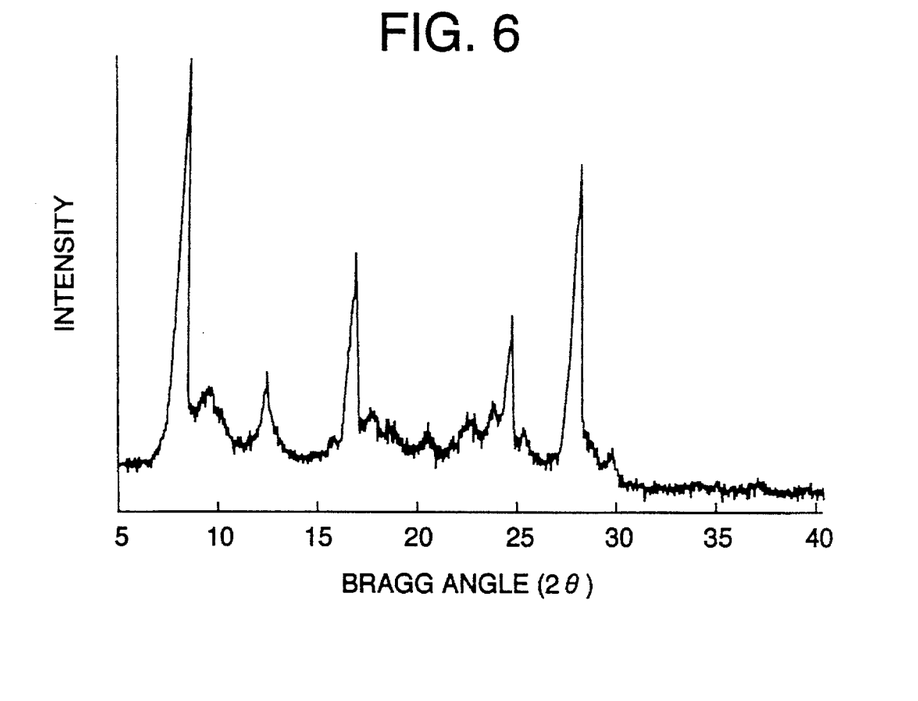
Figure 7:
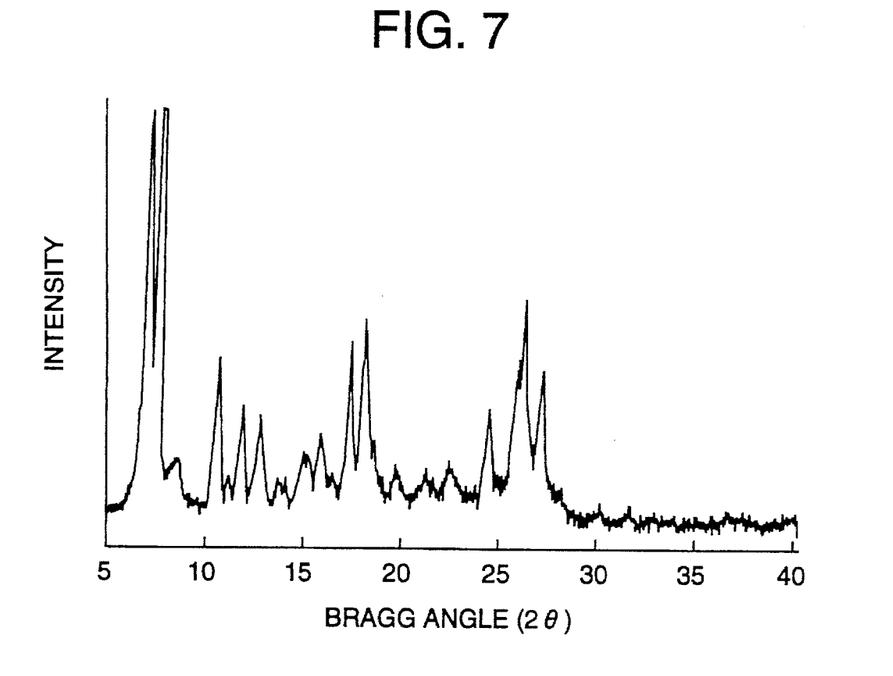

| Example No. | Solvent | Powder X-Ray Diffraction Pattern |
|---|---|---|
| 11 | methyl alcohol | FIG. 5 |
| 12 | dimethyl sulfoxide | FIG. 6 |
| 13 | benzyl alcohol | FIG. 7 |

EXAMPLE 14

Figure 8:
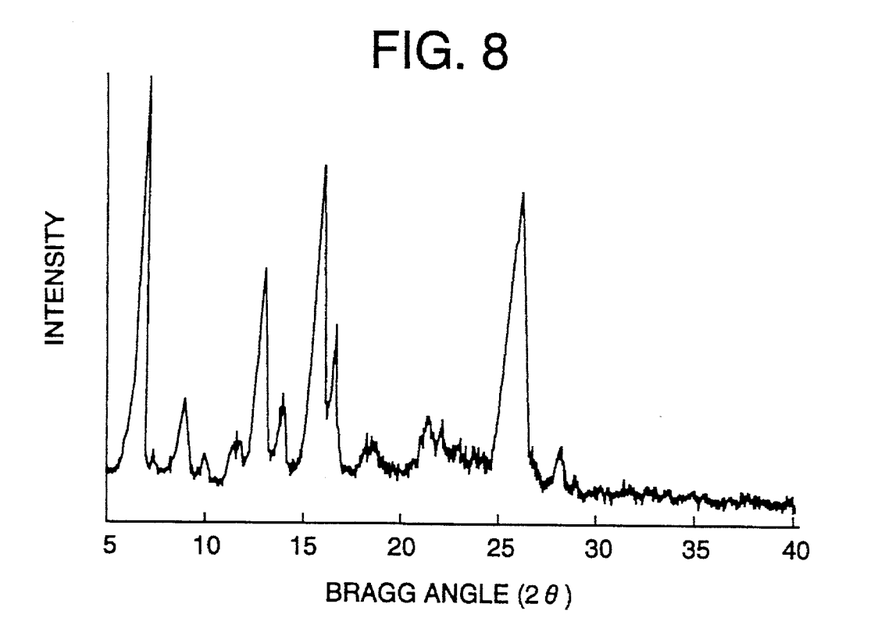

In 5 parts of ethylene glycol was added 0.5 part of the hydroxygallium phthalocyanine crystals obtained in Example 4, followed by stirring at 100° C. for 7 hours. The crystals were separated, washed with methyl alcohol, and dried. A powder X-ray diffraction pattern of the resulting crystals is shown in FIG. 8.

EXAMPLE 15

A solution consisting of 10 parts of a zirconium compound "Orgatics ZC 540" (produced by Matsumoto Seiyaku K.K.), 1 part of a silane compound "A 1110" (produced by Nippon Unicar Co., Ltd.), 40 parts of isopropyl alcohol, and 20 parts of butyl alcohol was coated on an aluminum substrate by dip coating and dried by heating at 150° C. for 10 minutes to form a subbing layer having a thickness of 0.5 μm.

0.1 part of the hydroxygallium phthalocyanine crystals obtained in Example 7 was mixed with 0.1 part of a polyvinyl butyral resin "S-Lec BM-S" (produced by Sekisui Chemical Co., Ltd.) and 10 parts of n-butyl acetate, and the mixture was dispersed in a paint shaker together with glass beads for 1 hour. The resulting coating composition was coated on the subbing layer with a wire bar No. 5, and dried by heating at 100° C. for 10 minutes to form a charge generating layer having a thickness of 0.15 μm. X-Ray diffractometry of the hydroxygallium phthalocyanine crystals in the dispersion revealed that the crystal form had not changed on being dispersed.

In 20 parts of monochlorobenzene were dissolved 2 parts of N,N'-diphenyl-N,N'-bis (m-tolyl)benzidine represented by formula (1):

(1)

and 3 parts of a polycarbonate resin represented by formula (2):

(2)

and the resulting coating composition was coated on the charge generating layer by dip coating and dried by heating at 120° C. for 1 hour to form a charge transporting layer having a thickness of 20 μm.

Electrophotographic characteristics of the thus prepared electrophotographic photoreceptor were evaluated as follows.

The photoreceptor was charged by a corona discharge of −2.5 μA using a flat plate scanner manufactured by Fuji Xerox Co., Ltd. to an initial surface potential $V_0$ (V) under a normal temperature and normal humidity condition (20° C., 40% RH). A dark decay potential after 1 second $V_{DDP}$ (V) was measured to obtain a dark decay rate DDR (%) (i.e., $100(V_0-V_{DDP})/V_0$). Then, the photoreceptor was exposed to monochromatic light of 780 nm, which was isolated from light emitted from a tungsten lamp by means of a monochromator and adjusted to 0.25 μW/cm$^2$ on the surface of the photoreceptor, and the initial sensitivity dV/dE (V·cm$^2$/erg) was measured. The results of these measurements are shown in Table 3 below.

EXAMPLES 16 TO 18

An electrophotographic photoreceptor was prepared in the same manner as in Example 15, except for using the hydroxygallium phthalocyanine crystals obtained in Examples 8 to 10. The resulting photoreceptor was evaluated in the same manner as in Example 15. The results obtained are shown in Table 3.

COMPARATIVE EXAMPLES 7 TO 9

A comparative photoreceptor was prepared in the same manner as in Example 15, except for using the hydroxygallium phthalocyanine crystals obtained in Comparative Examples 4 to 6. The photoreceptor was evaluated in the same manner as in Example 15. The results obtained are shown in Table 3.

TABLE 3

| Example No. | HOGaPc* Used | $V_0$ (V) | $V_{DDP}$ (V) | DDR (%) | dV/dE (V·cm$^2$/erg) |
|---|---|---|---|---|---|
| Example 15 | Example 7 | −563 | −523 | 7.2 | 179 |
| Example 16 | Example 8 | −630 | −603 | 4.3 | 182 |
| Example 17 | Example 9 | −614 | −590 | 3.8 | 182 |
| Example 18 | Example 10 | −639 | −618 | 3.3 | 178 |
| Compar. Example 7 | Compar. Example 4 | −576 | −521 | 9.5 | 185 |
| Compar. Example 8 | Compar. Example 5 | −520 | −474 | 8.8 | 184 |
| Compar. Example 9 | Compar. Example 6 | −598 | −548 | 8.4 | 186 |

Note:
*Hydroxygallium phthalocyanine

As can be seen from the results in Table 3, the hydroxymetal phthalocyanine crystals obtained by the process of the present invention exhibit high photosensitivity with small dark decay. The hydroxygallium phthalocyanine crystals which were obtained by further subjecting crystals purified by the process of the present invention to a solvent treatment has a novel crystal form as demonstrated above and is particularly excellent in photosensitivity and durability.

Accordingly, the electrophotographic photoreceptor of the present invention containing the purified hydroxymetal phthalocyanine as a charge generating material exhibits small dark decay and high sensitivity and furnishes excellent image characteristics in printers, etc. utilizing a semiconductor laser.

While the invention has been described in detail and with reference to specific examples thereof, it will be apparent to one skilled in the art that various changes and modifications can be made therein without departing from the spirit and scope thereof.

What is claimed is:

1. A process for preparing a purified hydroxy metal phthalocyanine comprising dissolving or slurrying a precursor of a hydroxymetal phthalocyanine in an acid, precipitating a hydroxymetal phthalocyanine in a solvent or a basic solution, and in an immediate next washing step, heat treating the resulting hydroxymetal phthalocyanine in a solvent having dissolved therein a base.

2. A process as claimed in claim 1, wherein said acid is sulfuric acid.

3. A process as claimed in claim 1, wherein said solvent or said basic solution for precipitation is water or a basic aqueous solution.

4. A process as claimed in claim 1, wherein said base dissolved in the solvent for heat treatment is an alkali hydroxide.

5. A process as claimed in claim 4, wherein said alkali hydroxide is sodium hydroxide or potassium hydroxide.

6. A process as claimed in claim 1, wherein said hydroxymetal phthalocyanine contains aluminum, gallium, indium, silicon, germanium or tin as a coordinating metal.

7. A process as claimed in claim 1, wherein said precursor is a chlorometal phthalocyanine.

8. A process as claimed in claim 1, wherein said precursor is a chlorogallium phthalocyanine.

9. A process as claimed in claim 1, wherein said solvent for precipitating a hydroxymetal phthalocyanine is water or a mixture of water and a water-soluble organic solvent.

10. A process as claimed in claim 9, wherein said solvent is a lower alcohol, a lower ketone, an ether, dimethylformamide or dimethyl sulfoxide.

11. A process as claimed in claim 10, wherein said lower alcohol is selected from the group consisting of methyl alcohol and ethyl alcohol, said lower ketone is selected from the group consisting of acetone and methyl ethyl ketone and said ether is selected from the group consisting of diethyl ether, methyl cellusolve and dioxane.

12. A process as claimed in claim 1, wherein said basic solution comprises a base that is an alkali hydroxide, ammonia or a quaternary ammonium hydroxide.

13. A process as claimed in claim 12, wherein said base is ammonia.

14. A process as claimed in claim 1, wherein said solvent for heat treating the resulting hydroxymetal phthalocyanine is water or a mixture of water and a water-soluble organic solvent.

15. A process as claimed in claim 14, wherein said water-soluble organic solvent is a lower alcohol, a lower ketone, an ether, dimethyl formamide or dimethyl sulfoxide.

16. A process as claimed in claim 14, wherein said lower alcohol is selected from the group consisting of methyl alcohol and ethyl alcohol, said lower ketone is selected from the group consisting of acetone and methylethyl ketone and said ether is selected from the group consisting of diethylether, methyl cellusolve and dioxane.

17. A process for preparing a purified hydroxymetal phthalocyanine comprising dissolving or slurrying a chlorometal phthalocyanine precursor of a hydroxymetal phthalocyanine in an acid, precipitating a hydroxymetal phthalocyanine in a solvent selected from the group consisting of water, water soluble organic solvent and a basic solution containing ammonia, and in an immediate next washing step, heat treating the resulting hydroxymetal phthalocyanine in water containing ammonia or a mixture of water and a water-soluble organic solvent containing ammonia.

* * * * *